United States Patent
Yahav et al.

(10) Patent No.: US 8,200,258 B2
(45) Date of Patent: Jun. 12, 2012

(54) SYSTEM AND METHODS FOR COMMUNICATION BETWEEN INSTANT MESSAGE USERS AND SHORT MESSAGE SERVICE USERS

(75) Inventors: Edo Yahav, Hod Hasharon (IL); Yitzhak Weiss, Givat Shmuel (IL); Alexander Sloutsky, Raanana (IL)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 12/210,660

(22) Filed: Sep. 15, 2008

(65) Prior Publication Data
US 2010/0069095 A1 Mar. 18, 2010

(51) Int. Cl.
H04W 4/00 (2009.01)
H04M 3/42 (2006.01)
H04L 29/08 (2006.01)

(52) U.S. Cl. .................. 455/466; 455/414.1; 455/414.4

(58) Field of Classification Search ............... 455/414.4, 455/466, 414.1
See application file for complete search history.

(56) References Cited

U.S. PATENT DOCUMENTS

| | | | |
|---|---|---|---|
| 6,178,331 B1 | 1/2001 | Holmes et al. | |
| 6,714,793 B1 | 3/2004 | Carey et al. | |
| 6,760,580 B2 | 7/2004 | Robinson et al. | |
| 6,775,262 B1 | 8/2004 | Skog et al. | |
| 6,957,077 B2 | 10/2005 | Dehlin | |
| 7,113,803 B2 | 9/2006 | Dehlin | |
| 7,120,455 B1 | 10/2006 | Chen et al. | |
| 2005/0025300 A1 | 2/2005 | Lagadec et al. | |
| 2005/0255868 A1* | 11/2005 | Dehlin | 455/466 |
| 2006/0148499 A1 | 7/2006 | Chie | |
| 2006/0167849 A1 | 7/2006 | Marcus et al. | |
| 2007/0033255 A1 | 2/2007 | Sanjeeva et al. | |
| 2007/0177568 A1* | 8/2007 | Clontz et al. | 370/349 |
| 2008/0132259 A1 | 6/2008 | Vin | |
| 2009/0124270 A1* | 5/2009 | Kelley | 455/466 |

FOREIGN PATENT DOCUMENTS

| | | |
|---|---|---|
| EP | 1720305 A1 | 8/2006 |
| EP | 1377086 B1 | 10/2006 |
| GB | 2385241 A | 8/2003 |

OTHER PUBLICATIONS

Text Message Server, Computrad Europe LTD, http://www.1st-computer-networks.co.uk/text-message-server.htm.
Text-connect, http://www.racedays.co.uk/sms/sms_text_benefits.htm.

* cited by examiner

*Primary Examiner* — Nick Corsaro
*Assistant Examiner* — Edd Rianne Plata
(74) *Attorney, Agent, or Firm* — Vierra Magen Marcus & DeNiro LLP

(57) ABSTRACT

A routing system receives an instant message (IM) from a user via an IM service. The IM contains a source address associated with the IM user and a destination address associated with a contact in the IM user's "buddy" list. A temporary mobile device number is allocated to the IM user. The IM is converted to a text message suitable for delivery to the selected contact's mobile device via a short message service, whereby the temporary mobile device number allocated to the IM user is the source address of the text message. Upon receipt of the text message, the contact may compose and send a reply text message to the IM user via the temporary mobile device number. The reply text message is routed to the IM user via an IM service based on the temporary mobile device number allocated to the IM user.

20 Claims, 7 Drawing Sheets

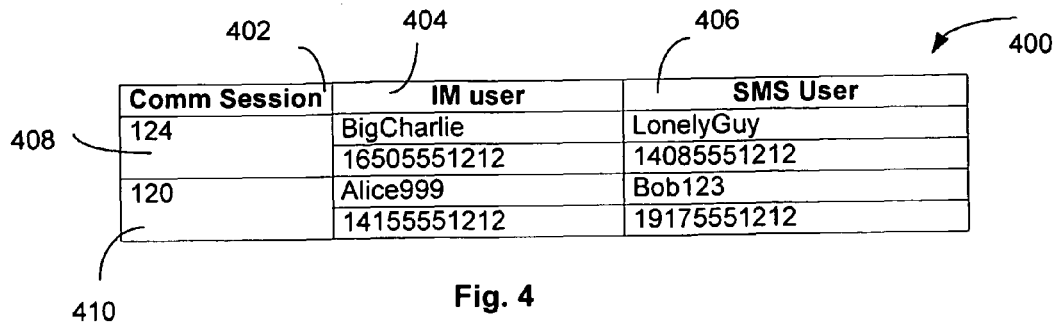
Fig. 4
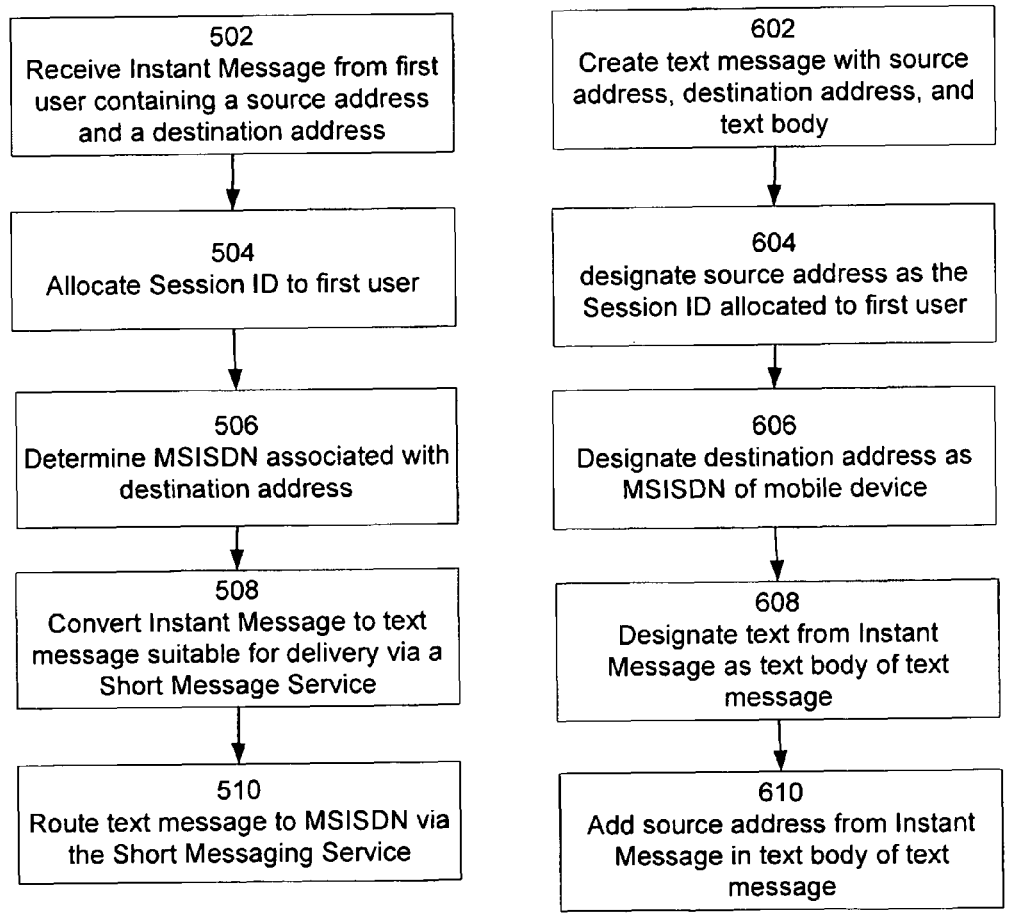
Fig. 5
Fig. 6

SYSTEM AND METHODS FOR COMMUNICATION BETWEEN INSTANT MESSAGE USERS AND SHORT MESSAGE SERVICE USERS

BACKGROUND

Instant messaging (IM) applications have become increasingly popular as they allow users to exchange text messages using conventional mobile and stationary computing devices, such as PDAs, cell phones, laptop and desktop computers and the like. Typically, an application running on the computing device allows the user to access a list of contacts to quickly initiate a messaging session with a selected friend, co-worker or other user. Each contact is associated with an identifier that allows the messaging infrastructure to route messages to the designated user. Additionally, the messaging application provides presence information to allow the user to determine which of the contacts are currently on-line.

IM allows a user to send and receive messages nearly instantaneously with other IM service users over a network or collection of networks, such as the Internet. IM services are provided by service providers such as "MICROSOFT" Corporation. A computer connected to the Internet can access the IM service using a client application. The client application can be implemented as a local client or a browser based client. A local client is a program which is stored on the computer and provides an interface allowing a user to access the IM service. A browser based client is a program which is generally provided by a web server. The interface loaded from the server allows the user to access the IM service. IM services are provided to an IM service domain, which is comprised of entities having an account with the IM service.

To use IM, a user establishes an account by providing account information including a user identifier, a password, and a list of messenger contacts. Subsequent login to the service requires the user to provide the user identifier and password. Upon confirmation of the login information with the user's account information, the particular client (either local or browser based) displays an interface indicating the user's presence, messenger contact list and the presence of each contact. Presence is a status indication of whether an entity is online or offline. In another embodiment, a presence can have a state of "busy", "away", "out to lunch", or other states. If the entity, such as the user or a contact on the user's messenger contact list, is logged in to a messenger server within the IM service, than the entity's presence is "online". Otherwise, the presence for the entity is "offline".

The user may select a contact from the messenger contact list displayed in an IM interface to initiate a conversation. Once selected, the client application associated with each conversation member provides a conversation window. In some IM systems, the client applications associated with a conversation receive direct contact information for each other to provide direct communication between them. In other IM services, the client applications for each conversation member are connected to each other through the IM system. When a conversation member sends a message, the IM system receives the message, finds the recipient member's computer location and routes the message to the particular computer. IM services such as "WINDOWS LIVE MESSENGER" use this method. Instant messaging (IM) services are typically limited to interactions between users of a specific messaging service/network, although some services offer inter-connectivity between services/networks.

Short Message Service (SMS) is a service that enables users to exchange short text messages over a communication network. Text messages can originate from various sources, such as by a mobile device (e.g., mobile phone, PDA, etc.) configured to exchange text messages. SMS is a store and forward service, i.e., text messages are not sent directly from sender to recipient, but always via a Short Message Service Center (SMSC). The SMSC handles and manages the text messages by routing text messages between mobile users via each device's Mobile Station International Subscriber Directory Number (MSISDN).

SUMMARY

One aspect of the present technology is to enable communication between users communicating through different messaging services. By way of example only, a first user may select a contact from their "buddy" list, compose an IM and send the IM to the contact. If the "buddy" is offline, he will receive the IM as a text message on his mobile device via an SMS. An instant message includes, among other things, a source address and a destination address. The source address of the IM is an identifier associated with the IM user. The destination address of the IM is an identifier associated with the selected contact. In one embodiment, the source address and destination address comprise IM identifiers (e.g., email addresses, nicknames, etc.).

In order for the contact to receive a text message via an SMS, a routing system converts the IM to a text message. A text message format also includes a source address and a destination address. However, the source address and destination address of a text message comprise mobile device numbers (e.g., MSISDNs). When the routing system receives the IM, the system identifies the selected contact's mobile device number (e.g., MSISDN) based on the destination address contained in the IM. A temporary MSISDN is allocated to the IM user. The IM is converted to a text message, using the temporary MSISDN allocated to the IM user as the source address and the contact's MSISDN as the destination address. The text message is routed to the contact via an SMS. Using a valid MSISDN, rather than a short code, allows the service to work across different mobile networks.

Another aspect of the present technology is to allow the contact that received the text message to deliver a reply text message to the IM user. The text message received by the contact identifies that the message was sent from a certain MSISDN (the MSISDN temporarily allocated to the IM user). Users typically will not reply to a text message from an unfamiliar MSISDN. Thus, in one embodiment, the text message sent to the contact also includes the identifier of the IM user that sent the original IM. When the contact composes and sends a reply text message via an SMS, the reply text message includes a source address and a destination address. The source address is the contact's MSISDN. The destination address is the MSISDN temporarily allocated to the IM user. When the routing system receives the reply text message, the system converts the reply text message to a format suitable for delivery to the IM user via an IM service.

In order to send the reply text message to the IM user, the system determines the identifier of the IM user based on the MSISDN in the destination address of the reply text message, which is the MSISDN temporarily allocated to the IM user. The system also determines the contact's identifier based on the MSISDN contained in the source address of the reply text message, which is the MSISDN of the contact's mobile device. The contact's identifier is placed in the source address of the reply IM and the IM user's identifier is placed in the destination address of the reply IM. The reply IM, containing the text from the reply text message, is then routed to the IM user via an IM service.

Another aspect of the present technology is to re-use the temporarily allocated MSISDNs across multiple concurrent communication sessions. In one embodiment, the system generates a communication session table for tracking each communication session. Each time a communication session is initiated, the IM identifier of the IM user is associated with a temporary MSISDN. Both are also associated with the IM identifier and MSISDN of the "buddy" the IM user is sending the IM to. The table allows the service to route messages between a large number of subscribers using a relatively small pool of MSISDNs for allocation to IM users.

BRIEF DESCRIPTION OF THE DRAWINGS

FIG. 4 provides an exemplary communication table.

FIG. 5 provides a flowchart diagram illustrating delivery of an instant message to a mobile device user via a short message service.

FIG. 6 provides a flowchart diagram illustrating additional detail of converting the instant message to a text message.

DETAILED DESCRIPTION

The technology described herein enables bi-directional IM sessions between IM users communicating via an IM service and mobile phone users communicating via an SMS. An MSISDN is temporarily allocated to the IM user so that a routing system can transmit messages across different networks when SMS interconnectivity is involved. In one embodiment, the MSISDN is allocated to the IM user by a cellular network operator. An IM received from an IM user is converted to a text message suitable for delivery to a mobile device user via an SMS. The MSISDN allocated to the IM user is the source address of the text message while the mobile device MSISDN is the destination address. If the mobile device user composes and sends a reply text via an SMS, the reply text message is converted to an IM, and based on the MSISDN allocated to the IM user, is routed back to the IM user as an IM via an IM service.

Figure 1:
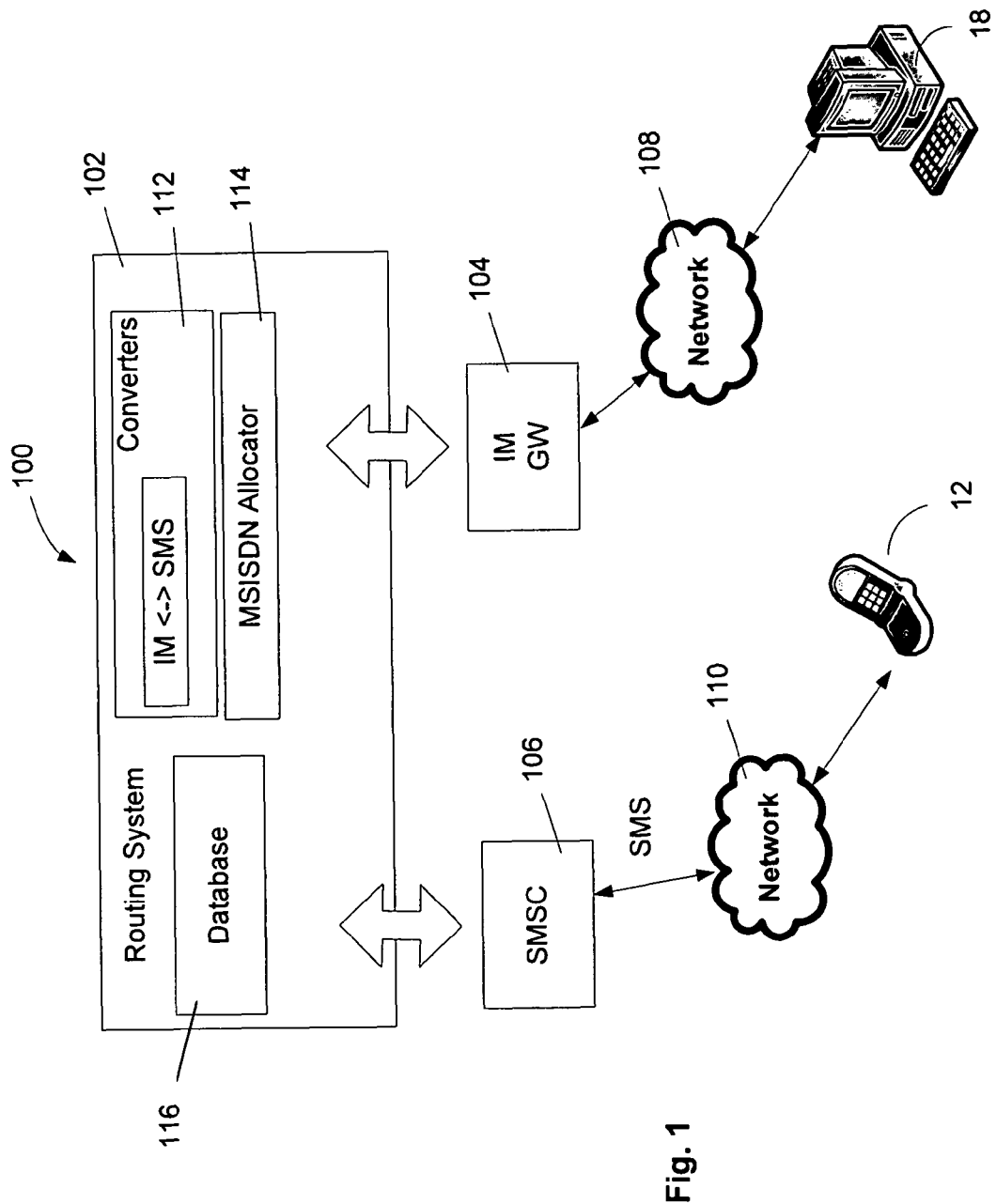
FIG. 1 provides a block diagram illustrating one embodiment of the network architecture of the present technology.

FIG. 1 illustrates an exemplary network architecture of the present technology. The system 100 enables communication between a user sending instant messages via an IM client 18 and a user sending text messages via a mobile device 12. The IM client 18 shown in FIG. 1 is illustrated as a personal computer for sending and receiving instant messages via a network 108. A user may use other devices such as, but not limited to, laptop computers, cellular phones, PDAs, etc. The network 108 may comprise an IM service (e.g., WINDOWS LIVE, AOL, etc.). The mobile device 12 shown in FIG. 1 is illustrated as a mobile phone to send and receive a text messages via a network 110. A user may use other devices to send/receive text messages such as, but not limited to, a PDA, and the like. The network 110 may comprise any SMS service.

The system 100 generally includes a routing system 102, an instant message gateway (IM GW) 104, a short messaging service center (SMSC) 106, a first network 108 and a second network 110. The routing system 102 includes converters 112, an MSISDN allocator 114 and a database 116. The converters 112 convert messages suitable for delivery via an IM service into a message suitable for delivery via an SMS and vice versa. The MSISDN allocator 114 dynamically allocates MSISDNs to IM users (described in more detail later). As will be described in more detail later, the database 116 maps the user identifiers and MSISDNs involved in each communication session established between an IM user and an SMS user.

Figure 2:
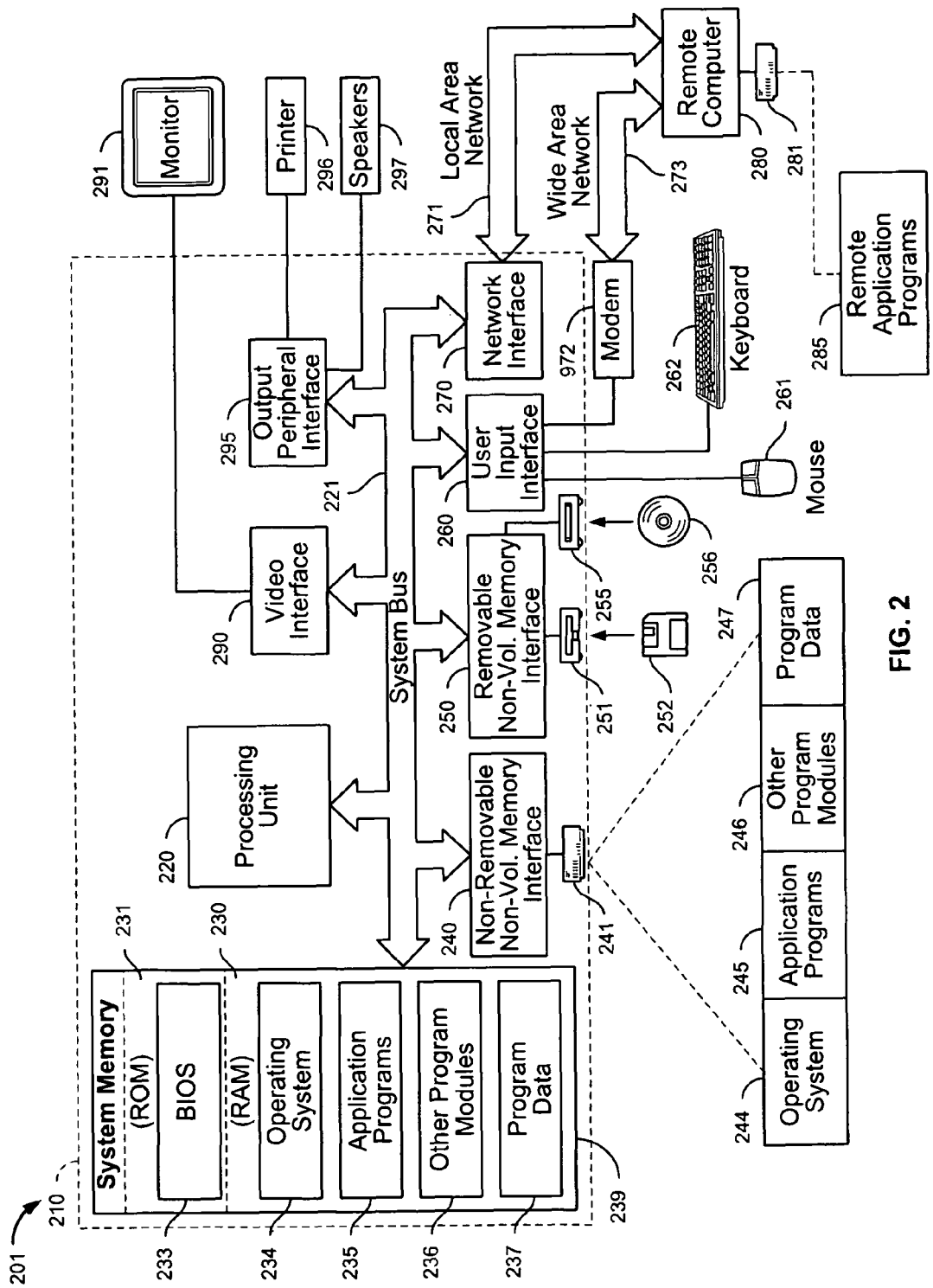
FIG. 2 provides a block diagram of a computer system for performing the methods described herein.

With reference to FIG. 2, an exemplary system for implementing an IM-SMS communication system includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 may include a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 230 includes computer storage media in the form of volatile and/or nonvolatile memory such as ROM 231 and RAM 232. A basic input/output system (BIOS) 233, containing the basic routines that help to transfer information between elements within computer 910, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disc drive 241 that reads from or writes to non-removable, nonvolatile magnetic media and a magnetic disc drive 951 that reads from or writes to a removable, nonvolatile magnetic disc 252. Computer 210 may further include an optical media reading device 255 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 241 is typically connected to the system bus 221 through a non-removable memory interface such as interface 240. Magnetic disc drive 251 and optical media reading device 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disc drive 241 is illustrated as storing operating system 244, application programs 245, other program modules 246, and program data 247. These components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262 and a pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 981 has been illustrated in FIG. 2. The logical connections depicted in FIG. 2 include a local window network (LAN) 271 and a wide window network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communication over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communication link between the computers may be used.

Figure 3A:
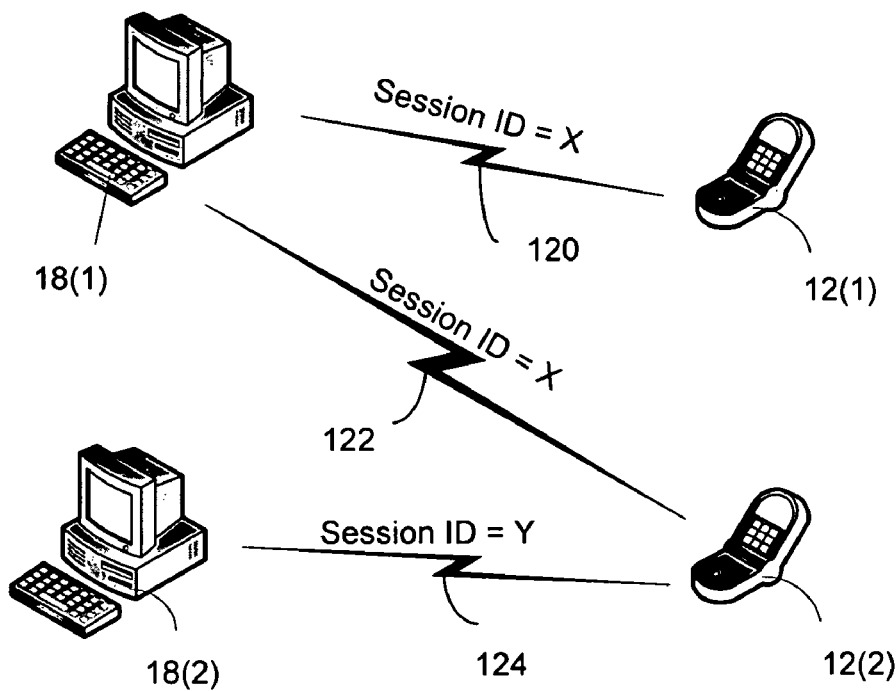
FIGS. 3A-3B provide block diagrams illustrating several communication connections between IM users and SMS users.
Figure 3B:
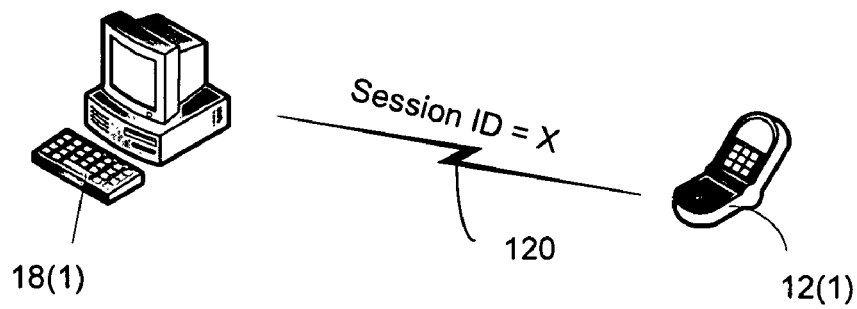
Figure 3B:
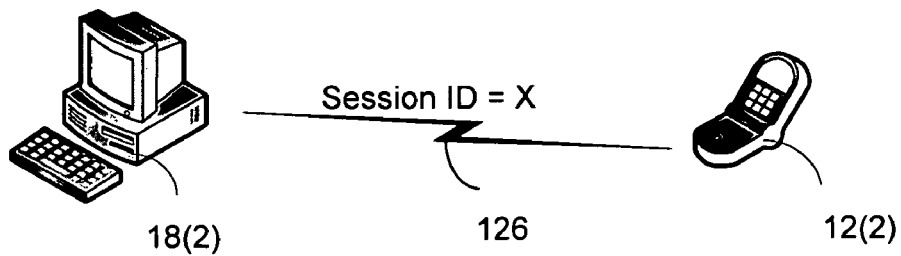

FIG. 3A illustrates, for the purpose of describing the technology herein only, exemplary communication sessions between IM users 18(1) and 18(2) and SMS users 12(1) and 12(2). In particular, FIG. 3A illustrates three individual communication sessions 120, 122 and 124: a first communication session 120 has been established between IM user 18(1) and SMS user 12(1); a second communication session 122 has been established between IM user 18(1) and SMS user 12(2); and a third communication session 124 has been established between IM user 18(2) and SMS user 12(2). As will be discussed in more detail later, the IM user 18(1) has been temporarily allocated a Session ID X (e.g., an MSISDN) in connection with communication sessions 120 and 122 and IM user 18(2) has been allocated a different Session ID, Session ID Y, in connection with communication session 124. FIG. 3B illustrates the scenario where only communication sessions 120 and 126 have been established. The communication session 120 has been established between IM user 18(1) and SMS user 12(1). The communication session 126 has been established between IM user 18(2) and SMS user 12(2). As will be discussed in more detail later, session ID X has been allocated to both IM user 18(1) and IM user 18(2). The communication sessions and users shown in FIGS. 3A-3B will be referred to throughout to describe several aspects the present technology. In one embodiment, the IM users and SMS users are subscribers of the same mobile network operator. Alternatively, the IM users and SMS users are subscribers of different mobile network operators.

FIG. 5 illustrates exemplary steps for routing an IM sent from an IM user to an SMS user as a text message via an SMS. By way of example only, FIG. 5 will be described in the context of IM user 18(1) sending an IM to SMS user 12(1). FIG. 5 is, of course, not limited to these two users. IM services often allow the IM user to maintain a list of people (e.g., "buddy" list or contact list) with whom to interact. For the purpose of describing this technology only, the IM user 18(1) composed an IM by selecting the IM identifier associated with the SMS user 12(1) (e.g., "Bob123") from his contact list when the IM window 1002 appears (see FIG. 10). The IM user 18(1) composes the message "Bob. R U available to talk right now?"

Figure 10:
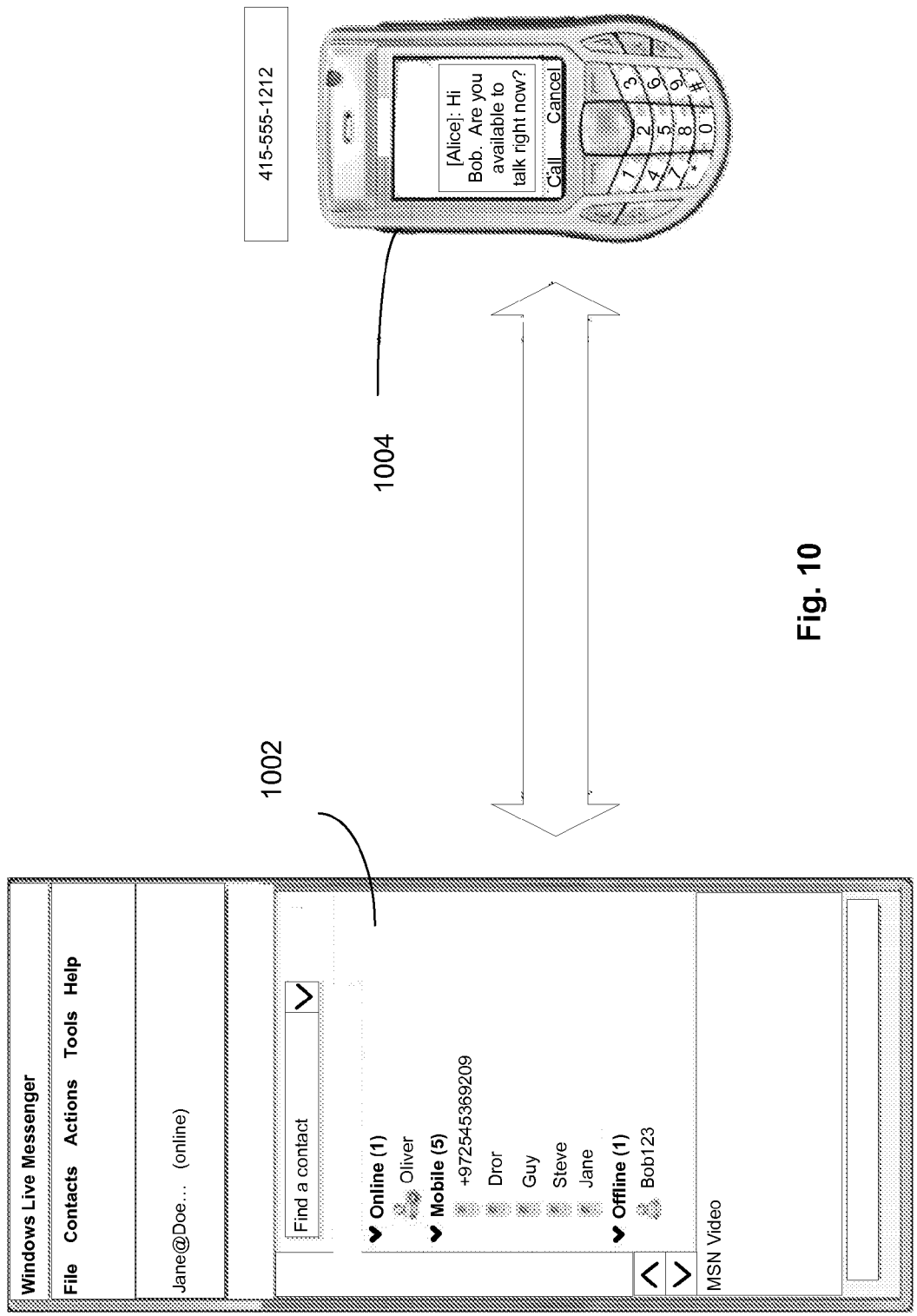
FIG. 10 provides an exemplary mobile phone and instant message interface.

At step 502, the instant message is received by the IM gateway 104 from IM user 18(1). The IM received from the IM user 18(1) contains certain information which, among other things, includes a source address, a destination address and a message. In one embodiment, the source address of the IM is the email address of the IM user 18(1). In alternative embodiments, the source address of the IM may comprise a nickname, "buddy" name, etc. associated with the IM user 18(1) (each referred to as an "identifier"). The destination address of the IM received from the IM user 18(1) is an IM identifier associated with the contact selected from the IM user's 18(1) contact list, which in this case, is the SMS user 12(1). As shown in FIG. 10, SMS user 12(1), shown in the window 1002 as "Bob123", is offline.

At this point, because SMS user 12(1) is offline, the routing system 102 will deliver the IM to SMS user 12(1) via an SMS. To do so, the routing system 102 generates a text message based on the IM received in step 502 and routes the text message to SMSC 106. In order to have bidirectional communication within an SMS system across networks, both the source address and the destination address of the text message are valid MSISDNs. Otherwise, the message would be limited to routing within a single network because short codes, for example, are network specific.

Here, the originating message was an IM composed by IM user 18(1), and was not sent from a mobile device. Thus, at step 504, the MSISDN allocator 114 of the routing system 102 allocates a Session ID (e.g., MSISDN) to the IM user 18(1). By way of example only, a pool of MSISDNs is controlled by a network operator, and each valid MSISDN in the pool is reserved for use only as a Session ID. One example of valid MSISDN is a telephone number that includes a Country Code+National Destination Code (NDC)+Subscriber Number. For example, the MSISDN 14155551212 comprises the Country Code 1 (United States), NDC 415 (415 area code) and Subscriber Number (555-1212).

One advantage of the present technology is that valid MSISDNs are allocated to the IM user as opposed to short codes, etc. This allows the present technology to send messages between users across different cellular networks (e.g., the SMS user is a subscriber of a different cellular network operator than the IM user). Another advantage is that dynamically allocating MSISDNs to IM users allows the cellular network operator to use a small pool of MSISDNs for the service, eliminating the need to allocate a dedicated MSISDN for each IM user using the service. Of course, it is within the scope of the technology to allocate one MSISDN to each IM user. By way of example only, a cellular network operator could reserve 1,000 MSISDNs for the communication service described herein. Each of these 1,000 MSISDNs is allocated to an IM user when communicating with an SMS user, and may be reallocated to another IM user when returned or released back to the cellular network operator pool. For the purpose of describing the technology only, the MSISDN allocator 114 allocates the MSISDN "14155551212" to IM user 18(1), at step 504.

The database 116 maps and stores each communication session. Each communication session is uniquely identified by a combination of identifiers: the SMS MSISDN of the SMS user's mobile device and the MSISDN temporarily allocated to the IM user.

FIG. 4 provides an example of a table 400 generated and maintained by the database 106. Using the table 400 shown in FIG. 4, the database 106 tracks, for each communication session ID 402, IM user information 404 and SMS user 406. As discussed above, communication session 124 is established between IM user 18(2) and SMS user 12(2). For communication session ID 124 (408), the database 106 stores the following IM user information 404 associated with communication session 124: IM identifier is "BigCharlie" and the temporary MSISDN is 16505551212. The database 106 also stored the following information associated with the SMS user (12(2): IM identifier is "LonelyGuy" and the MSISDN of the SMS user's mobile device is 14085551212. For the communication session 120, the database stores the following IM user information 402 in table 400: IM identifier associated with the IM user 18(1) is "Alice999" and the temporary MSISDN assigned to IM user 18(1) is 14155551212. The table 400 also stores the SMS user information 406 associated with the communication session 120: the IM identifier associated with SMS user 12(1) is "Bob123" and the MSISN of the SMS user's mobile device is 19175551212.

In order to deliver the IM composed by the IM user 18(1) to the SMS user 12(1) via an SMS, the routing system 102 generates a text message suitable for delivery to SMS user 12(1) via an SMS. A format suitable for delivering text messages via an SMS includes, among other things, a source MSISDN and a destination MSISDN. In this case, the destination MSISDN is the MSISDN of the mobile device of the SMS user 12(1). The source MSISDN is the MSISDN temporarily allocated to the IM user 18(1). At step 506, the routing system 102 determines the MSISDN of the mobile device associated with the identifier contained in the destination address of the IM composed by IM user 18(1). Using the example provided in FIG. 5, the routing system 102 obtains the IM identifier contained in the destination address of the IM, which is the "buddy" name selected by the IM user 18(1) in his contact list ("Bob123"), and determines the MSISDN of the contact's mobile device. For the purpose of describing this technology only, the MSISDN of the SMS user's 12(1) mobile phone is 19175551212. The system looks up the MSISDN of the SMS user in the IM user's address book that is stored in the IM servers. The MSISDN of each of the IM user's "buddies" may be entered into the IM user's address book in various methods, e.g.: (1) manually entered by the IM user through the IM client, (2) automatically taken from the SMS user's profile on the IM service (in case he also has an IM service account), where it was entered by the SMS user during his service registration to the IM service or later, or (3) synchronized from the IM user's mobile phone address book and matched with the corresponding "buddy" entry, according to the email address field, first and last name etc. The system may look up the MSISDN of the SMS user by other methods.

At step 508, the converter 112 in the routing system 102 converts the IM to a text message suitable for delivery to the SMS user 12(1) via an SMS. FIG. 6 illustrates the detail of step 508 (convert IM to SMS) in FIG. 5. At step 602, a text message is generated that includes, among other things, a source address, a destination address and a text body. At step 604, the source address of the text message is designated as the MSISDN that has been allocated to the IM user 18(1), 14155551212. At step 606, the destination address of the text message is designated as the MSISDN of the mobile device of the SMS user's 12(1), 19175551212.

At step 608, the message contained in the IM is placed into the text body of the text message. At step 610, the IM user's 18(1) user identity is placed in the text body of the text message. For the purpose of describing this technology only, the IM user's IM identifier is "Alice999." Other identifiers associated with the IM user 18(1) may be placed in the text body of the text message. At this point, a text message has been generated based on the IM received from the IM user 18(1), and is ready to be routed to the SMSC 106.

At step 510, the text message generated by the routing system 102 is routed by the SMSC 106 to the MSISDN of the mobile device of the SMS user 12(1). Because the source address of the text message is a valid MSISDN, the text message can be delivered to the SMS user 12(1) across networks, if necessary. The SMS user 12(1) receives the text message "Hi Bob. R U available to talk right now?" on his mobile phone 1004. FIG. 10 shows an exemplary text message received by the SMS user with the IM user's identity inserted into the text body of the text message. Step 610 is not required. The SMS user 12(1) can identify that the text message was sent from "14155551212" (not shown in FIG. 10). Users will often delete text messages received from unknown phone numbers. Here, SMS user 12(1) will not recognize the MSISDN 14155551212 because the MSISDN is not stored in his mobile device address book. Thus, adding the IM user's identifier ("Alice999") in the body of the text message helps the SMS user 12(1) recognize who sent the text message because the SMS user 12(1) will likely recognize the IM identifier.

Figure 7:
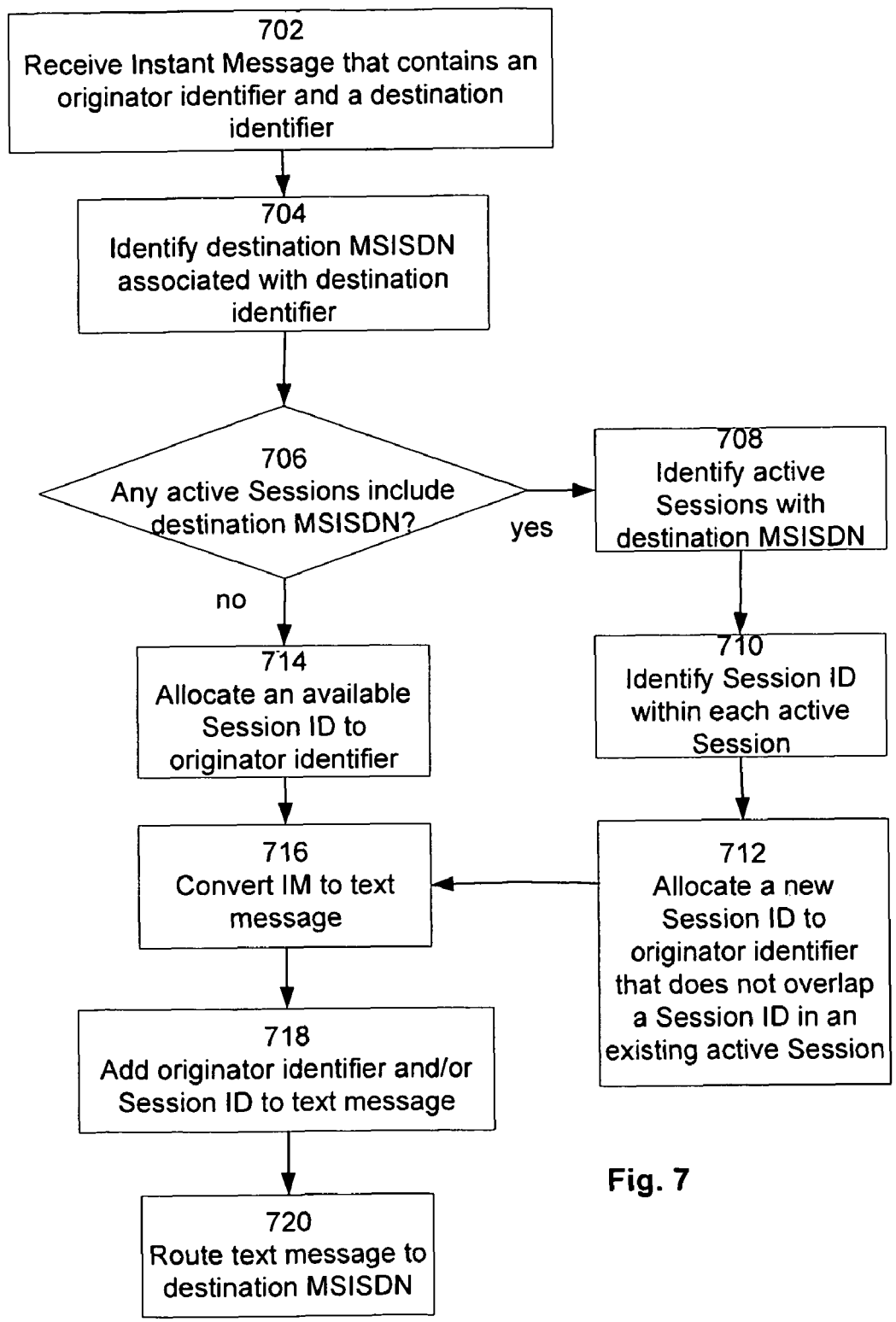
FIG. 7 provides a flowchart diagram illustrating one embodiment of allocating a Session ID to an instant message user.

FIG. 7 illustrates additional detail of one embodiment of step 504 (allocating Session ID) provided in FIG. 5. At step 702, the routing system 102 receives the IM from the IM gateway 104. As discussed above, the IM includes a source address, a destination address and a message. The source address of the IM is the IM identifier of the IM user 18(1) (e.g., "Alice999"). The destination address of the IM is the IM identifier of the SMS user 12(1) (e.g., "Bob123") shown in the contact list (see FIG. 10).

At step 704, the routing system 102 identifies the MSISDN associated with the IM identifier Bob123. As described above, the system may look up the MSISDN associated with the IM identifier via several different methods. For the purpose of describing the technology only, the SMS user 12(1) is not currently communicating with any other IM users, and the MSISDN associated with the IM identifier Bob 123 is 19175551212. At step 706, the routing system 102 determines that no other communication sessions are already established that contain the MSISDN of the mobile device of the SMS user 12(1). In one embodiment, the routing system 102 accesses the database 116 to determine if any of the communication sessions contain the MSISDN 19175551212. Thus, at step 714, the MSISDN allocator 114 allocates an available MSISDN to the IM user 18(1) (e.g., 14155551212).

At step 716, the IM received from the IM user 18(1) is converted to a text message (Step 508 in FIG. 5). The MSISDN allocated to the IM user 18(1), 14155551212, is the source address of the text message and the MSISDN of the mobile device of the SMS user 12(1), 19175551212, is the destination address of the text message.

If the destination MSISDN was involved in another communication session with another IM user, steps 708-712 would be performed (discussed later herein). By way of example only, suppose that the communication session 122 between IM user 18(1) and SMS user 12(2) was established prior to the IM user 18(2) composing and sending an IM to SMS user 12(2). In this case, at step 706, the routing system 102 determines that a prior communication session with SMS user 12(2) has been established. At step 708, the routing system 102 identifies that the prior communication session is communication session 122 based on looking up the MSISDN of SMS user 12(2) in the database 116.

At step 710, the routing system 102 identifies that IM user 18(1) has been allocated MSISDN, 14155551212. At step 712, the routing system 102 allocates a different Session ID (e.g., 16505551212) to IM user 18(2). In this scenario, SMS user 12(2) receives text messages from both IM user 18(1) and IM user 18(2). Allocating two different MSISDNs to the two IM users allows SMS user 12(2) to identify that the text messages are being sent from two different users. A text message received from IM user 18(1) will be identified as sent by "14155551212" while text messages received from IM user 18(2) will be identified as sent by "16505551212." The SMS user 12(2) may also reply individually to each IM user 18 by replying to different MSISDNs.

Each IM user 18 is temporarily allocated an MSISDN. The temporary MSISDN allocated to an IM user effectively allows an IM user 18 to deliver an IM to a mobile device via an SMS, regardless of whether the IM user and the SMS user are subscribers of the same network operator. The temporary MSISDN allocated to the IM user 18 also allows a mobile device user to reply to the IM user via an SMS. In one embodiment, each IM user 18 is allocated a dedicated MSISDN. However, MSISDNs are a limited and valuable resource for network operators. Thus, in an alternative embodiment, a network operator will reserve a limited number of MSISDNs, and dynamically allocate the MSISDNs to IM users as necessary for communicating with an SMS user 12. Any number of MSISDNs may be reserved for this use. If, for example, 1,000 MSISDNs were reserved, each SMS user 12 could simultaneously receive text message from 1,000 users. If the number of allocated MSISDNs required for communicating with a single SMS user 12 approaches the total number of reserved MSISDNs, the network operator may designate additional MSISDNs for such use.

Figure 8:
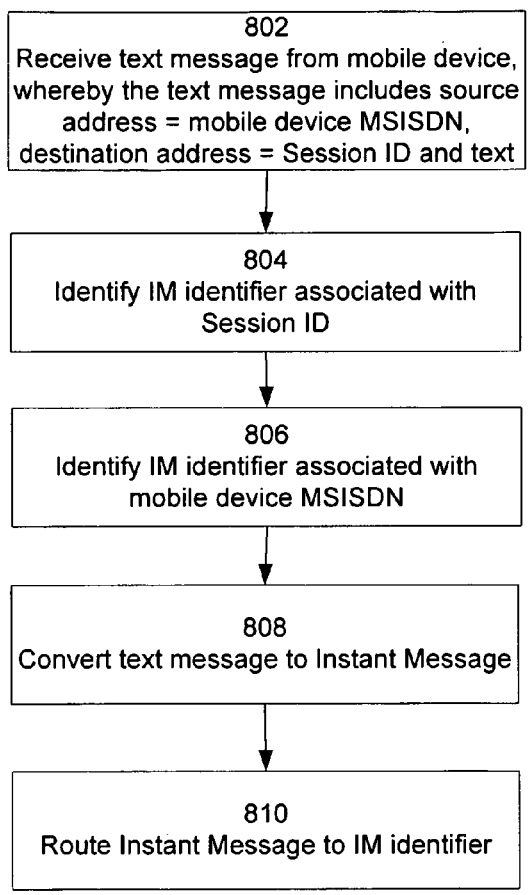
FIG. 8 provides a flowchart diagram illustrating delivery of a text message to an instant message user via an instant message services.

FIG. 8 illustrates exemplary steps for delivering a reply text message back to the IM user 18 via an IM service. Upon receiving a text message, the SMS user 12 selects "reply" on the mobile device and composes a reply text message. When the SMS user 12 selects "send," the text message is sent from the mobile device 1004 back to the SMSC 106. Using the example provided in FIG. 3A, SMS user 12(1) sends a reply text message "Yes I am. RU?" to IM user 18(1).

At step 802, the routing system 102 receives the reply text message from the SMSC 106. The reply text message includes a source address, a destination address and reply text. The source address of the reply text message is the MSISDN of the mobile device of the SMS user 12(1), 19175551212. The destination address of the reply text message is the MSISDN temporarily allocated to the IM user 18(1), 14155551212, which was the source address of the text message sent to the SMS user 12(1).

In order to deliver the reply text message to the IM user 18(1) via an IM service, the reply text message must first be converted to an IM. An IM requires an IM identifier for both the source address and the destination address. At step 804, the routing system 102 identifies the IM identifier associated with the MSISDN contained in the destination address of the reply text message. For example, the routing system 102 determines that the MSISDN 14155551212 is the destination address in the text message. The system 120 looks in the database 106 for the MSISDN in the table 400 to match the IM identifier "Alice999" with the MSISDN. The IM identifier provides the email address and device location to send the IM.

At step 806, the routing system 102 identifies the MSISDN in the source address of the reply text message. Based on matching the MSISDN in the table 400, the system 102 identifies the IM identifier associated with the MSISDN of the mobile device of the SMS user 12(1), 19175551212. Using the example provided above, the IM identifier associated with the MSISDN 19175551212 is "Bob123."

At step 808, the routing system 102 converts the reply text message into an IM. At step 810, the routing system 102 routes the IM to the IM gateway 104. The IM gateway 104 transmits the IM to IM user 18(1) via the IM network 108.

Figure 9:
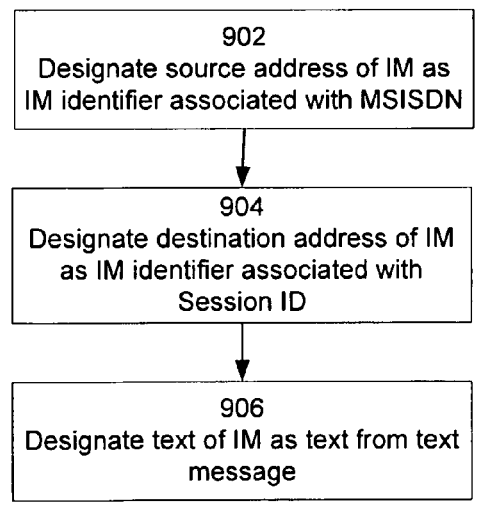
FIG. 9 provides a flowchart illustrating one embodiment of converting a text message to an instant message.

FIG. 9 illustrates exemplary steps for converting the reply text message into an IM (step 808). As discussed above, an IM service sends messages between IM users based on source addresses and destination addresses. At step 902, the routing system 102 designates the IM identifier ("Bob123") associated with the SMS user's 12(1) MSISDN ("Bob123") as the source address of the IM. BY way of example only, the system 102 looks up the MSISDN obtained in the source address of the reply text message in the database 116, and identifies the IM identifier associated with the MSISDN. At step 904, the routing system 102 designates the IM identifier associated with the IM user 18(1) ("Alice999") as the destination address of the IM. At step 906, the routing system 102 imports the text portion of the reply text message into the IM text body (e.g., "Yes I am. R U?"). At this point, the IM gateway 104 is ready to deliver the IM to the destination address designated in the IM (step 810).

Referring back to FIG. 3A, IM user 18(1), now selects the IM identifier ("LonelyGuy") from her "buddy" list and composes an IM. The IM identifier "LonelyGuy" is the identifier of SMS user 12(2). Because SMS user 12(2) is offline, SMS user 12(2) is available only through his mobile device. In order to deliver the IM to the SMS user 12(2), the IM must be converted to a format suitable for delivery via an SMS. An SMS format requires a source MSISDN and a destination MSISDN. At step 502, the routing system 102 receives this second IM from the IM user 18(1) via the IM gateway 104. The routing system 102 recognizes that a temporary MSISDN has already been allocated to IM user 18(1), 14155551212. Thus, step 504 is not necessary, and there is no need to allocate a new or second MSISDN to IM user 18(1). The MSISDN previously allocated to "Alice999" for the communication session 120 with "Bob123" is reused during the communications session 122 with "LonelyGuy." Accordingly, a new MSISDN is not required every time an IM user sends an instant message to an SMS user. At step 506, the routing system 102 determines the MSISDN of the mobile device of the SMS user 12(2), 14085551212. At step 508, the routing system 102 converts the IM received from IM user 18(1) into a text message suitable for delivery to the mobile device of the SMS user 12(2) via an SMS.

At step 510, the routing system 102 transmits the text message to the SMSC 106. This text message contains a source address comprising the temporary MSISDN allocated to IM user 18(1), a destination address comprising the MSISDN associated with SMS user 12(2), and a text message. In one embodiment, the text message contains the user identifier associated with IM user 18(1) (e.g., "Alice999"). SMS user 12(2) receives a text message on his mobile device, and can identify who sent the text message by either recognizing the MSISDN temporarily allocated to IM user 18(1) or, more likely, recognizing the IM identifier.

Upon receiving the text message, SMS user 12(2) composes and sends a reply text message from his mobile device back to IM user 18(1). The reply text message includes a source address (the MSISDN of the mobile device of SMS user 12(2)), a destination address (the MSISDN temporarily allocated to IM user 18(1)), and reply text. Referring back to FIG. 8, when SMS user 12(2) composes and sends a reply text message to IM user 18(1), the routing system 102 receives the reply text message from the SMSC 106, at step 802. The routing system 102 identifies the IM identifier associated with the MSISDN allocated to IM user 18(1), at step 604.

At step 806, the IM identifier associated with the MSISDN located in the source address of the reply text message is identified. Thus, the routing system 102 determines the IM identifier associated with SMS user 12(2) (e.g., "LonelyGuy"). At step 808, the reply text message is converted to an IM. At step 810, the IM is routed to the IM gateway 104, and ultimately forwarded to IM user 18(1). From the perspective of the IM user 18(1), she is "chatting" with SMS user 12(1) and SMS user 12(2). For example, it appears to IM user 18(1) that SMS user 12(1) and SMS user 12(2) are online and are communicating with her via an IM service. From the perspective of the SMS user 12(1) and the SMS user 12(2), they are each "texting" with IM user 18(1) via an SMS.

Suppose IM user 18(2) now composes and sends an IM to SMS user 12(2) by selecting IM user's 12(2) "buddy" name ("LonelyGuy") in his contact list and typing a message, i.e., "How was the ski trip?". At step 702, the routing system 102 receives the instant message from IM user 18(2). The source address of the IM is the IM identifier associated with IM user 18(2) (e.g., "BigCharlie") and the destination address of the IM is the IM identifier associated with SMS user 12(2), "LonelyGuy." At step 704, the MSISDN of the mobile device of SMS user 12(2) is identified as 14085551212.

At step 706, it is determined whether any active communication sessions include the MSISDN of the mobile device of SMS user 12(2). For the purpose of describing this technology only, the communication session 122 has previously been established and is still active. Thus, at step 708, the communication session 122 is identified as an active session that includes the MSISDN of the mobile device of the SMS user 12(2). At step 710, the MSISDN allocated to the IM user 18(2) is identified. IM users communicating with the same SMS user should not be allocated the same MSISDN so that the SMS user can distinguish who is sending the messages. At step 712, an available MSISDN is allocated to IM user 18(2) that differs from the MSISDN allocated to IM user 18(1).

MSISDNs are temporarily allocated to an IM user and are returned to the pool when the communication session has ended (or some predetermined time after). The routing system 102 attempts to avoid allocating a recently returned MSISDN to a new IM user communicating with an SMS user who was recently receiving text message from the recently returned MSISDN. Otherwise, it will appear to the SMS user that they are receiving new messages from the prior user.

At this point, SMS user 12(2) is receiving text messages from IM user 18(1) and IM user 18(2). SMS user 12(2) is able to differentiate who is sending her text messages because the source address of each text message is the MSISDN temporarily allocated to the IM user 18 sending the message. For example, when SMS user 12(2) receives a text message from IM user 18(1), the text message will contain the message "sent from 14155551212," and optionally contain the IM identifier, "Alice999," in the body of the text message. When SMS user 12(2) receives a text message from IM user 18(2), the text message will contain the message "sent from 16505551212," and optionally contain the IM identifier, "BigCharlie," in the body of the text message.

At step 714, the IM message from IM user 18(2) is converted to a text message suitable for delivery via an SMS. The source address of the text message is the MSISDN allocated to IM user 18(2) for this communication session 124, 16505551212. The destination address of the text message is the MSISDN of the mobile device of SMS user 12(2). The message is inserted into the body of the text message, at step 718. At step 720, the routing system 102 routes the text message to the IM gateway 104, which forwards the text message to the MSISDN of the mobile device of SMS user 12(2). If the SMS user 12(2) composes and sends a reply text message to IM user 18(2), steps 802-810 in FIG. 8 are performed to route the reply text message back to IM user 18(2) via an IM service.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method of communicating between a first user and a second user using different messaging services, comprising:
   receiving a first message from the first user in a first format via a first messaging service, wherein the first message contains a source identifier associated with the first user, a destination identifier associated with the second user and text;
   identifying a destination mobile device number associated with the second user based on the destination identifier contained in the first message;
   determining one or more existing active communication sessions between the first user and the second user;
   allocating a session identification to the first user responsive to determining the one or more active communication sessions between the first user and the second user, said allocating a session identification to the first user includes allocating a session identification to the first user that does not overlap a session identification associated with the determined one or more existing active communication sessions between the first user and the second user;
   converting the first message received in the first format into a second message in a second format;
   routing the second message to a mobile device associated with the destination mobile device number, wherein the second message is routed to the destination mobile device number via a second messaging service.

2. The method as recited in claim 1, wherein the first messaging service comprises an instant message (IM) service.

3. The method as recited in claim 2, wherein the second messaging service comprises a short message service (SMS).

4. The method as recited in claim 3, wherein the step of allocating a session identification to the source identifier comprises the step of:
   allocating a Mobile Station International Subscriber Directory Number (MSISDN) to the first user.

5. The method as recited in claim 4, wherein the step of allocating an MSISDN to the first user comprises the steps of:
   obtaining an MSISDN from a network owner; and
   mapping the MSISDN to the source identifier associated with the first user.

6. The method as recited in claim 5, wherein the step of converting the first message in the first format into a second message in a second format further comprises the steps of:
   obtaining the source identifier from the first message; and
   adding the source identifier to the text in the second message.

7. The method as recited in claim 4, wherein the step of converting the first message received in the first format into a second message in a second format comprises the steps of:
   identifying the source identifier contained in the first message; and
   generating a second message in the second format, wherein the second message includes a source address comprising the MSISDN allocated to the first user, a destination address comprising the destination mobile device number and the text from the first message.

8. The method as recited in claim 4, wherein identifying a destination mobile device number comprises the step of identifying an MSISDN of the mobile device of the second user.

9. The method as recited in claim 8, wherein converting the first message into a second message comprises the step of:
   generating a text message suitable for delivery via an SMS, wherein the source address of the text message is the MSISDN allocated to the first user and the destination address of the text message is the MSISDN of the mobile device of the second user.

10. A method for sending messages between a first user communicating via an instant message (IM) service operated by a first network operator and a second user communicating via a short messaging service (SMS) operated by a second network operator, comprising:
    receiving an IM from the first user, wherein the IM contains a source address and a destination address, the source address is an IM identifier associated with the first user and the destination address is an IM identifier associated with the second user;
    identifying a second Mobile Station International Subscriber Directory Number (MSISDN) associated with the second user based on the destination address contained in the IM;
    allocating a first MSISDN to the first user, allocating a first MSISDN to the first user including identifying one or more existing active communication sessions between the first user and the second user, and allocating an MSISDN to the first user that does not overlap an MSISDN associated with each of the one or more existing active communication sessions between the first user and the second user;
    converting the IM received from the first user to a text message suitable for delivery to the second user via an SMS, wherein the text message includes a source address and a destination address, the source address is the first MSISDN allocated to the first user and the destination address is the second MSISDN associated with the second user; and
    routing the text message to the second user via an SMS.

11. The method as recited in claim 10, wherein the step of converting the IM to a text message further comprises the step of:
    placing the IM identifier associated with the first user into a body portion of the text message.

12. The method as recited in claim 10, wherein the step of allocating a first MSISDN to the first user comprises the steps of:
    allocating the first MSISDN to the first user when a communication session is established between the first user and the second user; and
    returning the first MSISDN allocated to the first user to a network operator after the communication session between the first user and the second user has ended.

13. The method as recited in 10, further comprising the steps of:
    receiving a second IM from the first user, wherein the second IM contains a source address and a destination address, the source address is the IM identifier associated with the first user and the destination address is an IM identifier associated with a third user;
    identifying a third MSISDN associated with the third user based on the IM identifier associated with third user;
    converting the second IM to a second text message suitable for delivery to the third user via an SMS, the text message includes a source address and a destination address, wherein the first MSISDN allocated to the first user is the source address of the text message and a third MSISDN associated with a mobile device of the third user is the destination address of the text message;

routing the second text message to the third user via an SMS.

14. The method as recited in claim 13, further comprising the steps of:

receiving a response text message via an SMS from the third user intended for delivery to the first user, wherein the response text message includes a source address containing the third MSISDN associated with the third user's mobile device and a destination address containing the MSISDN allocated to the first user;

converting the response text message to an IM;

routing the IM to the IM identifier associated with the first user via an IM service.

15. The method as recited in claim 10, wherein the first network operator is different than the second network operator.

16. A method of enabling communications between a first user communicating via an instant message (IM) service and a second user communicating via a short message service (SMS), comprising:

receiving a text message via a first network operator on a mobile device of the second user via an SMS, wherein the text message contains a message sent by the first user via an IM service and a source address comprising a Mobile Station International Subscriber Directory Number (MSISDN) that has been temporarily allocated to the first user, said MSISDN has been temporarily allocated to the first user by identifying one or more existing active communication sessions between the first user and the second user and allocating an MSISDN to the first user that does not overlap an MSISDN associated with the one or more existing active communication sessions between the first user and the second user;

generating a response text message on the mobile device responsive to the text message received on the mobile device, the response text message is intended for delivery to the first user, wherein the response text message includes a source address comprising an MSISDN associated with the mobile device, a destination address comprising the MSISDN temporarily allocated to the first user and text;

receiving the response text message from the mobile device via the SMS;

converting the response text message to an IM, converting the response text message to an IM including identifying a communication session identification, the communication session identification including the MSISDN allocated to the first user, the MSISDN of the mobile device of the second user, an IM identifier associated with the MSISDN temporarily allocated to the first user, and an IM identifier associated with the MSISDN allocated to the second user; and routing the IM to the IM identifier associated with the MSISDN temporarily allocated to the first user via a second network operator via the IM service.

17. The method as recited in claim 16, wherein the first network operator is different than the second network operator.

18. The method as recited in claim 16, wherein the step of converting the response text message to an IM comprises the steps of:

identifying the IM identifier associated with the MSISDN of the mobile device;

identifying the IM identifier associated with the MSISDN temporarily allocated to the first user;

generating an IM that includes,
a source address comprising the IM identifier associated with the MSISDN of the mobile device;
a destination address comprising the IM identifier associated with the MSISDN temporarily allocated to the first user; and
the text from the response text message.

19. The method as recited in claim 18, wherein identifying the IM identifier associated with the MSISDN temporarily allocated to the first user comprises the steps of:

identifying a communication session identification stored in a database, wherein the communication session identification includes the MSISDN allocated to the first user, the MSISDN of the mobile device of the second user, and the IM identifier associated with the MSISDN allocated to the first user;

identifying the MSISDN allocated to the first user; and determining the IM identifier associated with the MSISDN allocated to the first user.

20. The method recited in claim 16, wherein the text message received via an SMS includes the IM identifier associated with the first user.

* * * * *